Patented Mar. 28, 1944

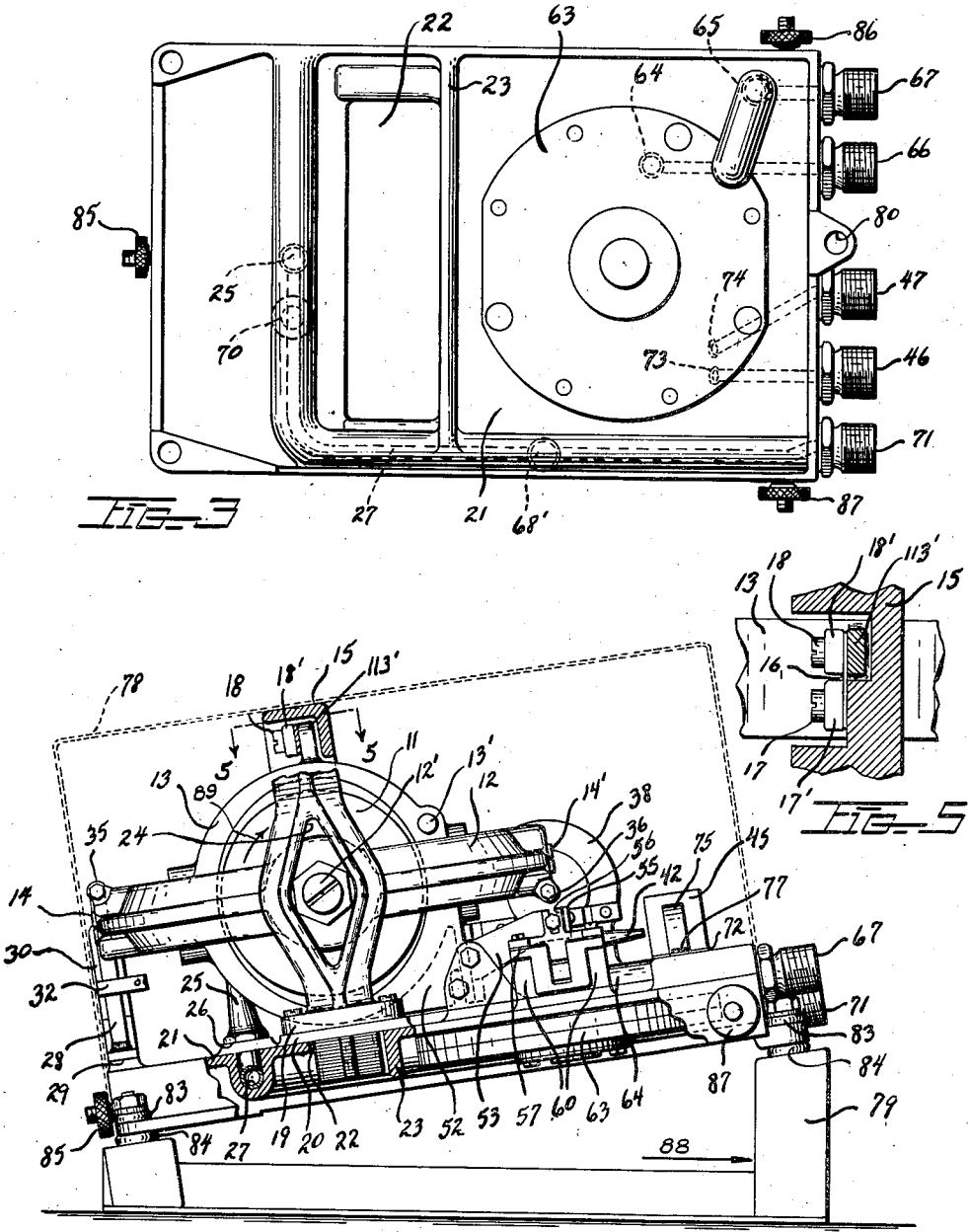

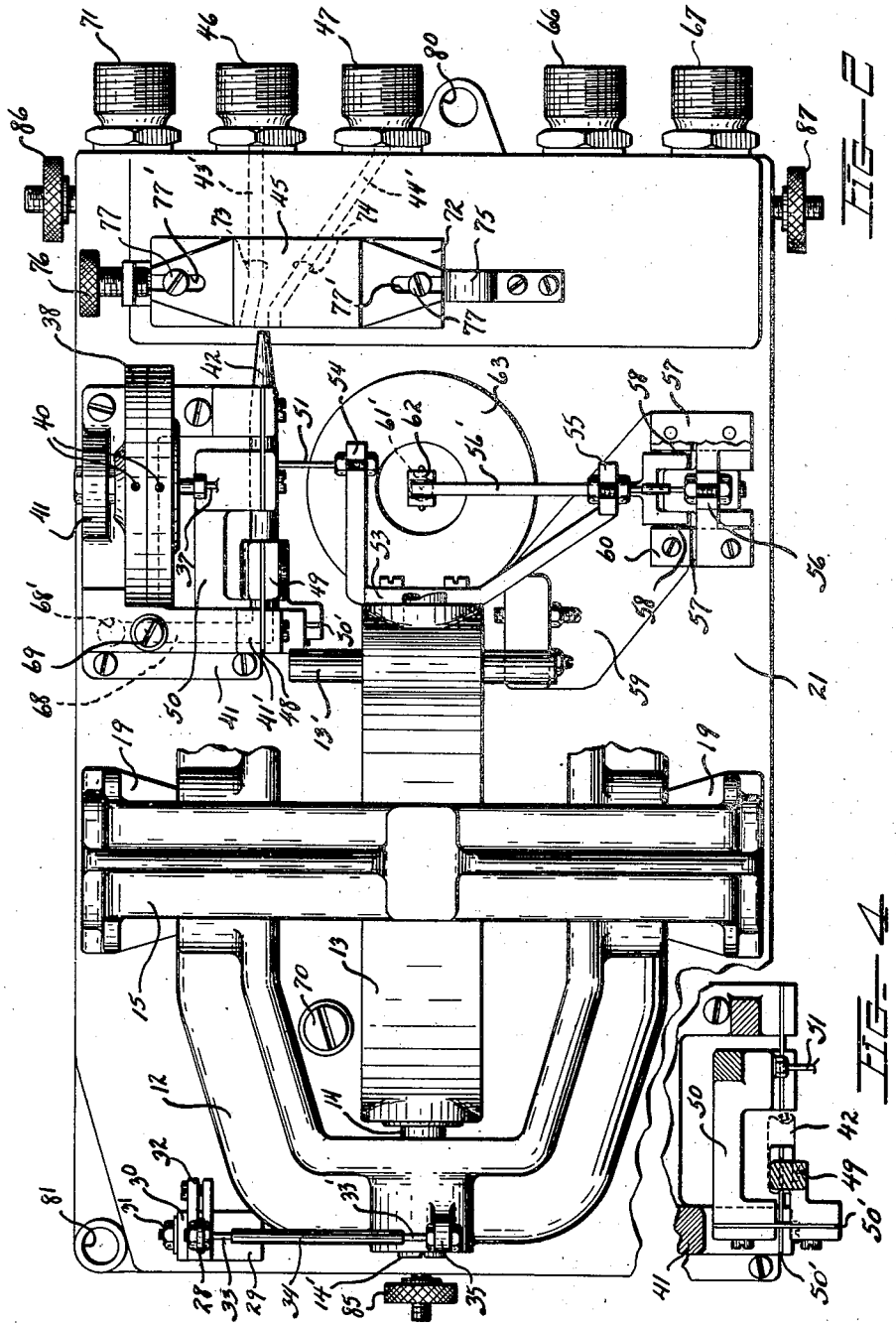

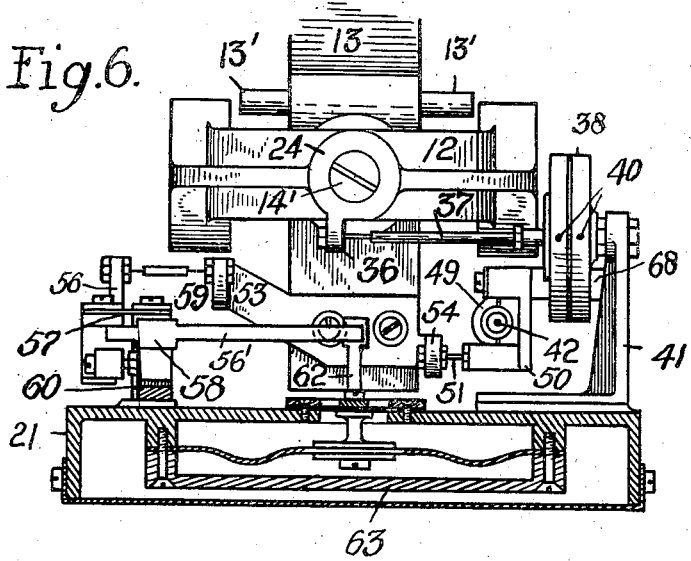

2,345,169

UNITED STATES PATENT OFFICE 2,345,169

ANGULAR RATE GYROSCOPE FOR AUTOMATIC STEERING

Guido Wünsch, Adam Kronenberger, and Karl Bauer, Berlin, Germany; vested in the Alien Property Custodian Application January 6, 1940, Serial No. 312,692
In Germany July 2, 1937

16 Claims. (Cl. 74—5)

It has been proposed to use for automatic steering devices for aircraft, a signal or impulse responsive to changes in course or attitude, another signal or signals responsive to the rate of change of course or attitude, sometimes referred to as the angular velocity of the craft (i. e., the first derivative of course change), and even a third signal responsive to the second derivative of the course or attitude change (i. e., the angular acceleration of the craft) in order to maintain the aircraft closely on its course or in its predetermined attitude without hunting. According to our invention, we propose to obtain both the angular velocity and angular acceleration terms from a single gyroscope of the angular rate or rate of turn type, on which also may be superimposed (if desired) a positional responsive signal from a directional gyroscope. Our improved gyroscope principally distinguishes from the ordinary rate of turn gyroscope by replacing the usual rigid connection to the craft about the axis of turn with a stiff spring by which the reactive torque exerted by the gyroscope on the craft may be measured. It may be shown both experimentally and mathematically that such torque is a measure of the angular acceleration of the craft. The extent of precession of the gyroscope against its usual centralizing springs is a measure of the angular velocity of the craft, as is well known in the art, but according to our invention, we combine this motion with the acceleration produced motion in a novel manner to produce a single signal responsive both to angular velocity and angular acceleration.

A further object of the invention is a relatively simple gyroscopic device which permits mutual adjustment of the impulse values due to both angular velocity and angular acceleration, and which is particularly adapted for use as impulse generator for an automatic steering device for aircraft. The gyro is suspended in gimbals and the gyro rotor bearing frame as well as the outer gimbal ring are spring restrained against the housing. The restraint is comparatively weak for the rotor bearing frame, but very strong for the gimbal ring, the gimbal ring being connected to a power control device for transmitting the two measured values. In adjusting the relative proportions of the two sets of restraining springs in order to adapt the device to the particular conditions under which it is to be used, it is necessary to keep in mind that the rotor bearing frame must have sufficient freedom for precession in order to be able to transmit to the gimbal ring a sufficient reaction as acceleration impulse, while the motions of the gimbal frame should be kept as small as possible.

In order to prevent oscillation of the gyro system, we prefer to provide a damping device which keeps the rotor bearing frame in a definite relation to the housing. As it is characteristic of a damping device to form the derivative of the measured value, it is possible to increase the impulse due to angular acceleration if the damping device is so arranged that it acts in the same sense against the gimbal frame as the torque resulting from the bearing pressure of the rotor bearing frame. This is the case if the damping device is arranged in one of the two angular sections which extend from the precession axis of the rotor bearing frame in the direction of rotation of the gyro to the main gimbal axis, as may be proved easily from the theory of the gyroscope.

In order to obtain an impulse due to angular velocity, the restraining spring for the rotor bearing frame must be so arranged that as the spring is loaded, a torque around the main gimbal axis is exerted on the gimbal frame. In order to add the angular velocity impulse to the angular acceleration impulse in the correct sense, the point of attachment of the restraining spring must be located in the same or at least in the diametrically opposite angular section as is the damping device.

As it is necessary, with a view to the correct functioning of the device, that the movements made by the gimbal frame should be very small, it is imperative to provide suspension of the gyro free from back-lash and without any lost motion, and furthermore, friction must be limited to the minimum. These requirements are fulfilled in the further development of the invention by using leaf springs or spring wires as suspension means for the gimbal frame and for the linkage attached to the gyro.

It was found that due to the yielding of the gyro around the main gimbal axis, there is sensitivity to angular velocities around an axis in the plane of measurement vertical to the gyro rotor axis. It is possible to compensate for this often disturbing influence by inclining the axis of the gyro rotor bearing frame against the plane of measurement. As shown by a vector diagram and confirmed by experience, the influence of the disturbing angular velocity is eliminated if the point at which the spring attaches to the rotor bearing frame is located in the plane of measurement going through the point of intersection of the gimbal axes, which, in the case of an automatic course steering device, is in the horizontal plane going through the intersection of the gimbal axes. The same is true also for the point of attachment of the damping device which, for practical reasons, preferably is arranged diametrically opposite to the point at which the restraining spring is attached.

It is recommended that the mechanical design of the device be arranged in such a way that the gyro and the power transmission device which transmits the measured values are mounted on a common frame or base plate, and that with vertical arrangement of the gimbal frame the same be suspended by means of leaf springs from a separate carrier frame mounted on the base plate. In order to make vertical dimensions small, it is possible to let the lower part of the last mentioned frame project into the base plate.

Especially characteristic of the embodiment of the invention as shown in the drawings, illustrating a pneumatically driven device, is the arrangement of air passages inside of the mounting plate through which air is conducted directly to the parts using the air without any pipe lines. In this way a compact arrangement is possible which is easily manufactured and assembled.

The present invention may be regarded as an improvement in the rate of turn gyro forming a part of the general system of automatic steering of aircraft shown in the prior application of Adam Kronenberger, one of the joint inventors of the present application, Serial No. 312,691, filed January 6, 1940, for Automatic steering devices for aircraft.

Further details of the invention will be apparent from the following description of the embodiment thereof.

Fig. 1 is a side elevation of the device after a protective cover shown in dash lines has been removed. The gyro is mounted in an inclined position on the mounting plate, shown partly in section, and the mounting plate itself is mounted in an inclined position on a separate frame.

Fig. 2 is a view from above on a larger scale and without the cover.

Fig. 3 is a view from below.

Fig. 4 is a sectional detail of the leaf spring pivotal support for the jet pipe.

Fig. 5 is a section along line 5—5 in Fig. 1, and shows the arrangement of the leaf springs for the gimbal frame.

Fig. 6 is a front elevation, partly in section, of the rate of turn gyroscope.

Fig. 7 is a diagrammatic view showing the systems of linkages and levers connecting the gyroscope, the jet pipe pick-off, control bellows, etc.

The gyro rotor 11 is air driven and is journaled on a horizontal spin axis in a frame 12, which in turn is carried by the gimbal frame 13 in pivots 14 for precession about a secondary axis. The gimbal frame is arranged inside of the rotor bearing frame 12 and has a rubber covered stop pin 13' which serves the purpose of limiting angular precession of the frame 12. The gimbal frame or vertical ring is mounted in a fixed frame 15 by means of leaf spring 16, giving said ring limited freedom about a main axis which is substantially vertical but preferably slightly inclined to the vertical, as shown in Fig. 1, for the reasons hereinafter explained. This axis may for convenience be referred to hereinafter as the vertical axis of the gyro except where the context clearly implies otherwise.

As shown in Fig. 5, the leaf sring 16 of the upper suspension is mounted against a machined surface of the frame 15 by means of a bolt 17 and a washer 17'. The other end of the spring is connected by means of bolt 18 and washer 18' to a projection 113' of the gimbal frame 13. The lower suspension of the gimbal frame is designed as an exact equivalent.

The frame 15 has two projections 19 by means of which it is mounted on the machined surface 20 of the base plate 21. As seen from Fig. 1, the suspension frame 15 projects at 22 through the frame-like base plate 21, which has ribs 23. This arrangement allows secure fastening of the suspension frame 15 and a lower height of the gyro unit. Openings 24 provided in the suspension frame 15 on both sides afford easy accessibility to the bearings 12' of the gyro rotor axis, which are threaded into the frame 12.

The gyro drive jet 25 is attached directly to a machined surface 26. The compressed air is fed to the jet through a passage 27 in the base plate.

The gyro is spring restrained around both gimbal axes. The comparatively weak restraint of the bearing frame 12 is obtained by means of a leaf spring 28 which is attached to a bracket fastened to the base plate at 29. By shifting of a clamp 32 attached to the bracket 30 by means of a screw 31 (Fig. 2), the effective length of the leaf spring may be adjusted so that the restraint of the rotor bearing frame 12 may be changed. The leaf spring 28 is attached to a projection 35 of the frame 12 by means of two spring wires 33 and 33' and a stiff intermediate member 34. The distance of the point of attachment from the axis of the pivot 14 is comparatively small so that the spring has a short lever arm about the precession axis 14 and is not greatly deflected.

On the other hand, the spring has a substantial lever arm about the vertical axis provided by spring 16, so that the precession of the gyroscope about axis 14 exerts a direct torque on spring 16, thereby causing a displacement about the substantially vertical axis proportional to the rate of turn of the craft. In this manner, the angular velocity term is added to the angular acceleration term so that the movement of the gyro with respect to the craft about this axis may be utilized as the signal producing means for actuating the servomotor of the automatic pilot.

In a similar way, on the other side of the frame 12 there is provided a projection 36 (Fig. 1) which is arranged below the pivot bearing 14' and which, with respect to the rotor spin axis, is located diametrically opposite to the projection 35. Connected to the projection 36 by means of a similar wire device 37 is a differential pressure diaphragm system which serves the purpose of damping oscillations of the gyro around the secondary gimbal axis 14—14'. In the diaphragm housing 38 (Fig. 2), in the middle of which a metal diaphragm 38' is mounted, there is on each side a hole 39 (Fig. 7) the cross section of which is adjustable by means of needle valves 40. In this way the entrance and exit of air in the two chambers of the housing may be adjusted in order to obtain the desired amount of damping. The use of a metal diaphragm for the damping of oscillations of the gyro rotor frame has the advantage of being free from friction as compared with the piston damping devices employed.

The diaphragm housing 38 is carried by a small bracket 41, which also carries the relay controlled by the precession of the gyro. A pneumatic jet pipe 42 has been provided, which in known manner is arranged opposite to two ports 43 and 44 which are contained in the distributor 45. In the mean position of the jet pipe, there is equal pressure in the two channels 43' and 44' which are connected to the two nipples 46 and 47. As the jet pipe is displaced from its mean position, a differential pressure is created in the lines which operates a rudder motor, if necessary, through a second relay. The nipples, as shown in Fig. 2 are threaded to receive the pipe couplings to and from the azimuth gyro and relay.

The jet pipe 42 is suspended from a projection 41' by a bracket 41 by means of a leaf spring 48, free from friction. The member 49 attached to the jet pipe is connected to the lever 50 by means of a multiplication leverage not shown in detail but consisting of a spring wire 51' and suitable arrangement of leaf springs 50'. The lever 50 is actuated by means of a spring wire 51 from the gimbal frame 13.

Because of the large multiplication between the gimbal frame and the jet pipe, the suspension spring 48 of the jet pipe together with the other leaf springs in the linkage provide considerable restraint for the gimbal frame 13, which very often is considerably stronger than the restraint produced by the suspension spring 16. It therefore may be assumed in first approximation that the gimbal frame, as compared with the restraint of the frame 12 by means of spring 28, is rigidly connected with the base plate 21 and extremely small turns are sufficient to move the jet pipe 42 in front of one or the other of the ports 43 and 44.

As may be seen in Figs. 1 and 2, the gimbal frame has on its lower righthand side a reinforced member 52 which carries a fork 53. The end 54 of the fork forms a mounting point for the wire 51, establishing the connection with the damping device 38 while the other end of the fork 55 is connected to a bell-crank 56, 56', which is carried by two leaf springs 57 and which may be oscillated around an axis 58. The leaf springs 57 are connected at one end to the crank 56 and at the other end to the columns 60 of a member 59 which is mounted on the base plate 21.

The other end 56' of the crank is connected by means of a shaft 61 with a fork 62. This fork is moved by a differential pressure diaphragm located in a diaphragm housing 63 mounted from below in the frame-like mounting plate 21. The vertical movements of the diaphragm are translated into lateral movements by means of the bell-crank 56. The diaphragm housing 63 has two nipples (not shown) which fit into corresponding openings of the mounting plate 21. The two chambers of the housing 63 thereby are directly connected to passages 64 and 65 cast into the mounting plate, which in turn are connected to external nipples 66 and 67.

The diaphragm enclosed in the housing 63 is controlled by means of an azimuth gyro (not shown), which in known manner produces a differential pressure as the aircraft deviates from its course, as shown, for example, in the aforesaid prior application of Adam Kronenberger. Course deviations therefore result in a pressure against the diaphragm which, by means of the linkage, 62, 61, 56', 56, is transmitted to the free end 55 of the crank, which in turn is rigidly connected to the gimbal frame 13.

Before the operation of the device is described, the following additional remarks must be made:

The jet pipe bracket 41 and the distributor 45 are directly mounted on the base plate and thereby connected to passages provided therein in a manner similar to that described for the gyro drive jet 25 and the diaphragm housing 63. The passages 68, shown in Fig. 2 by dash lines and leading to the jet pipe 42, are connected by means of a hole 68' with the same passage 27 in Fig. 3 which also serves the drive jet 25. The supply of compressed air for the passage 27 is obtained from a connecting nipple 71. In order to be able to adjust separately the pressure for the drive jet and for the jet pipe, two needle valves 69 and 70 have been provided, one in the passage 68 and the other one adjacent to the drive jet 25. The operator therefore is in a position to change the gyroscopic effect of the gyro by changing its speed and also to change the maximum differential pressure in the passages 43' and 44'. The steering effect of an automatic steering device for aircraft becomes more rigid as the gyroscopic effect is increased and the steering characteristic of the servomotor becomes stiffer as the pressure in the passages 43' and 44' is increased.

The distributor 45, which carries the ports 43 and 44, is fitted to the machined surface 72 (Figs. 1 and 2) and has on its under side two openings 73 and 74 (Figs. 2 and 3) which are connected to the passages 43' and 44' in the base plate. In order to line up the jet pipe 42 accurately with the ports 43 and 44, the jet pipe itself may be shifted by changing the length of the connecting member 51. Because of the extremely high multiplication between the gimbal frame and the jet pipe, the adjustment is, however, obtained more easily by shifting the distributor 45. For this purpose it is possible to shift the same by means of screw 76 against the pressure of a leaf spring 75, after loosening the two holding screws 77 which, during the adjustment, guide the distributor perpendicularly to the jet pipe, for which purpose slots 77' extending in the direction of movement are provided in the distributor instead of holes.

A cover 78, shown in dash lines in Fig. 1, covers the gyro for protection. Also the base plate is covered from below by means of a thin cover (not shown). Nuts 85—87 are used for simultaneous fastening of the top and bottom covers. In such a completely enclosed condition, the device is mounted on the frame 79 which previously has been attached to the floor of the airplane. Universal mounting is obtained by a three-point suspension. The mounting employs rubber links 83 and 84 which yield in case of hard shocks, but which have comparatively little spring action because the gyro must follow all motions of the airplane in order to obtain good steering action.

The operation of the gyro as an automatic steering device for course steering for aircraft is as follows:

If the airplane turns from its course about its vertical axis, a strong torque is immediately exerted on the gyroscope through the stiff spring 16, causing precession of the rotor bearing frame about axis 14 against weaker centralizing spring 28. Considering the component of this spring which acts about the precession axis only, the gyro will then precess until the precessional force equals the force of spring 28, at which point the gyro will reach a steady state about axis 14, if the rate of turn remains constant. In this condition it may be shown that there is no deflection of the spring 16, the force exerted by the spring 28 about axis 14 causing the gyro to precess about its vertical axis at the same rate the airplane is turning. In other words, the spring 16 only remains deflected during angular acceleration and is not deflected during straight line flight or during a turn at a constant rate.

As explained above, however, the spring 28 is connected to one side of the vertical axis so that it also exerts a torque about the vertical axis upon precession of the gyroscope about axis 14. This torque results in further precession about axis 14—14 and therefore alters the steady state position of the gyroscope about both axes, so that this change in position about the vertical axis (which varies with the angular velocity), is utilized to displace the jet pipe 42 in addition to the displacement of said pipe caused by the angular acceleration.

Because of the course deviation, a differential pressure has also been created in the passages 43' and 44' due to the action of the azimuth gyro, which by means of the diaphragm enclosed in the housing 63 exerts a force against the projection 55 of the gimbal frame 13. Furthermore, the reaction of the damping device 38 acts upon the rotor bearing frame 12 and thereby upon the main gimbal frame. All these steering impulses are so arranged in their direction that they add up. If the airplane moves in the direction of the arrow 88, then the gyro, which rotates in the direction of the arrow 89, precesses in the known way as the airplane turns to the left, or clockwise as seen in the direction of flight. The torque resulting from the restraining spring 28 therefore also acts clockwise as the gyro is viewed from above. As the connecting link 37 in Fig. 2 moves upward with the precession motion of the gyro just described, it is obvious that this torque also acts in the same sense against the gimbal frame 13. But the motion of the gimbal frame due to the precession motion of the rotor bearing frame follows in the same sense, which may be seen very easily if the whole gyro system is imagined as a mass with an inertia artificially increased many times. It is then evident that the gimbal frame must move relatively to the right as the airplane turns to the left, thereby trying to maintain its position in space. The impulse obtained from the course diaphragm 63 is so added to the above described action that a pull is exerted on the forked end 55. This means that there must be excess pressure in the lower diaphragm chamber which is connected to the nipple 67.

The clockwise motion of the gimbal frame 13 causes jet pipe 42, by means of the mechanical multiplication, to move a much greater amount to the left. This causes excess pressure in passage 43' which by means of nipple 46 is connected to an intermediate relay or directly to the rudder motor, which now turns the rudder of the airplane towards the right in order to thereby eliminate the deviation from course, all as shown in the aforesaid prior application of Adam Kronenberger.

As already described, the inclination of the gyro against the horizontal is used in order to eliminate the influence of angular velocities around the longitudinal axis of the airplane. For this purpose the connecting point 35 of the restraining spring and 36 of the damping device are so placed that the connecting line it located in the horizontal plane and goes through the gyro rotor axis. All rolling motions then are without disturbing influence, which may be explained most simply by the fact that the effective lever arm of the restraining spring or the damping respectively, has been made zero because the points 35 and 36 have zero distance from a horizontal plane through the gyro axis.

As may be shown by vector analysis, the angular velocity of the roll, in case of still further inclination of the frame, would act in a supporting sense, that is, in case of a rolling motion in counter-clockwise direction resulting from the attempt of a normal airplane to go into a counter-clockwise curve, the effect of the roll would produce a jet pipe displacement to the left in the same sense as produced by a reaction of the gyro to the turning around the vertical axis of the airplane.

This gyro device may be used for the stabilization of an airplane around the longitudinal axis or the transverse axis in the same manner as described for the vertical axis. In most cases the natural damping of the airplane around the two axes just mentioned is so great that the automatic steering device only needs to be equipped with the usual type of turn indicator gyro giving a signal proportional to angular velocity, while for course steering, because of the very small natural damping around the vertical axis, it is much more necessary to employ my improved type of turn indicator gyro which gives in addition angular acceleration values caused by the motion of the gimbal frame.

Having described our invention, what we claim and desire to secure by Letters Patent is:

1. An angular rate gyroscope for control of automatic steering devices of dirigible craft, comprising a base, a support on the base, a gimbal ring within the support, stiff spring means connecting the gimbal ring to said support whereby the gimbal ring has limited turning movement about an axis inclined to the vertical, a rotor bearing frame carried by the gimbal ring and pivoted on an axis substantially normal to said first mentioned axis, centralizing weaker spring means connecting said rotor bearing frame to said base to oppose precession whereby during a change in the angular acceleration of the gyroscope due to a change in the direction of the craft and consequent precession of the gyroscope about said second mentioned axis there also occurs a slight relative turning of the gimbal ring and its support which is proportional to such acceleration, a pick-off device on the base, means connecting the pick-off device to the gimbal ring whereby said pick-off device is responsive to the angular acceleration of the craft.

2. An angular rate and angular acceleration gyroscope as claimed in claim 12, having a damping device connected to said rotor bearing ring, comprising an air container, a flexible diaphragm therein connected to said ring, and air leaks on both sides of said container.

3. An angular rate and angular acceleration gyroscope as claimed in claim 12, characterized by support means fixed to said base plate and leaf springs suspending said ring in said support means.

4. An angular rate and angular acceleration gyroscope as claimed in claim 12, characterized by the fact that the main axis of the gyro is so inclined to the vertical that a line connecting the points of attachment of the centralizing springs to the rotor bearing frame lies in a horizontal plane which passes through the rotor axis.

5. A gyro according to claim 15, characterized by the arrangement of common mounting of the gyro and the signal generator or pick-off for the transmission of the measured values on a common mounting plate, whereby the gimbal frame is arranged vertically in the mounting plate in a separate suspension frame attached to the mounting plate by means of leaf springs.

6. A gyro according to claim 1, characterized by the feature that a diaphragm system for the damping of the gyro rotor frame is employed, said damping device having adjustable leaks.

7. Gyroscopic apparatus comprising a base plate, a pneumatically driven gyroscope mounted thereon, a pneumatically driven take-off transmitter including a jet pipe movable in response to changes in angular acceleration and angular velocity of the apparatus, distributing means carried by said base plate for delivering fluid discharged through the jet pipe to a pneumatically operated device, said distributing means comprising a block movable on said base plate, said block being provided with a pair of ducts, means connecting one end of each of said ducts to said pneumatically operated device, said block being mounted to have the other end of each of said ducts located adjacent the end of said jet pipe to receive fluid discharged therefrom and manually operated means for shifting the position of said block whereby to bring the ends of said ducts opposite the discharge end of said jet pipe into operating alignment therewith.

8. A gyro according to claim 12, characterized by the fact that the main axis is inclined in such a way that the sensitivity of the gyro to banking of the craft is substantially eliminated.

9. An angular rate and acceleration gyroscope as claimed in claim 12, having a system of motion multiplying levers between said gimbal ring and pick-off device, each lever being pivoted on a leaf spring.

10. An angular rate and acceleration gyroscope as claimed in claim 12, wherein said pick-off device comprises a jet pipe and a leaf spring providing a centralizing pivotal support therefor.

11. An angular rate and acceleration gyroscope as claimed in claim 12, wherein leaf springs are employed for centralizing about both the vertical and horizontal axes of the gyroscope.

12. In an angular rate gyroscope, a base plate, a gimbal ring mounted thereon for restrained turning about its main axis, a rotor bearing frame, a rotor journalled in said rotor bearing frame for spinning, the rotor bearing frame being mounted on said gimbal ring for turning about a secondary gimbal axis, relatively strong elastic restraining means connecting the gimbal ring to the base plate, relatively weak elastic restraining means connecting the rotor bearing frame to the base plate about both said axes, and a pick-off on the base plate connected to said gimbal ring, said pick-off giving a signal responsive to the angular rate and the angular acceleration acting on the base plate about said main axis.

13. An angular rate gyroscope as claimed in claim 12, having a damping device one part of which is connected to said base plate and the other part is connected to said rotor bearing frame at such point as to exert a force about both said axes in a direction to increase the displacement about the main axis whereby the acceleration signal is increased.

14. An angular rate gyroscope for control of automatic steering devices of dirigible craft as claimed in claim 1, having an additional means for applying torque on said ring proportional to amount of turn of said craft, whereby said pick-off device is also responsive to angular displacement.

15. In an angular rate gyroscope, a base plate, a gimbal ring mounted thereon for restrained turning about a main axis, a rotor bearing frame, a rotor journalled in said rotor bearing frame for spinning, the rotor bearing frame being mounted on said gimbal ring for turning about a secondary gimbal axis, relatively strong elastic restraining means connecting the gimbal ring to the base plate, relatively weak elastic restraining means connecting the rotor bearing frame to the base plate to yieldingly centralize the same about said secondary axis, and a pick-off mounted on the base plate and connected to said gimbal ring, said pick-off giving a signal responsive to angular acceleration of said base plate about said main axis.

16. An automatic steering device for aircraft, including the combination claimed in claim 12, of a pressure diaphragm responsive to the amount of course change signals whereby said pick-off is responsive to the summation of angular displacement, angular velocity and angular acceleration, said diaphragm being mounted upon the under side of said base plate and projecting through the same, and connection from said diaphragm to said pick-off device.

GUIDO WÜNSCH.
KARL BAUER.
ADAM KRONENBERGER.